United States Patent [19]

Rye

[11] Patent Number: 5,487,537
[45] Date of Patent: Jan. 30, 1996

[54] TRANSFER CASE STAND

[76] Inventor: Robert A. Rye, 523 E. Tamarack, Ironwood, Mich. 49938

[21] Appl. No.: 257,177

[22] Filed: Jun. 9, 1994

[51] Int. Cl.$^6$ ........................................ B23Q 1/04
[52] U.S. Cl. .................... 269/51; 269/69; 269/71
[58] Field of Search .................. 269/69, 71, 76, 269/900, 47, 50, 51, 17; 254/8 B, 133, 134

[56]           References Cited

U.S. PATENT DOCUMENTS

| | | | |
|---|---|---|---|
| 3,048,387 | 8/1962 | Waggoner | 269/71 |
| 3,298,681 | 1/1967 | Youngblood | 269/900 |
| 4,145,006 | 3/1979 | Webb | 269/71 |

Primary Examiner—Robert C. Watson

[57]              ABSTRACT

A transfer case stand for securely holding and supporting a transfer case of a vehicle from a fixed location for allowing ready access by a mechanic comprising a cylindrical casing having a base end and a tip end; a ring positioned above the casing at a location such that the central axis of the ring is essentially perpendicular to the central axis of the casing, the ring having a plurality of holes disposed therearound for receiving bolts of a transfer case of a vehicle; a bracing mechanism coupled between the casing and ring; and a positionable coupling mechanism for coupling the base end of the casing to a fixed location such that the central axis of the ring is held at a selected angular orientation, thereby allowing a transfer case coupled thereto be held at the same selected orientation.

3 Claims, 4 Drawing Sheets

TRANSFER CASE STAND

BACKGROUND OF THE INVENTION

1. Field of the Invention

The present invention relates to a transfer case stand and more particularly pertains to securely holding and supporting a transfer case of a vehicle from a fixed location for allowing ready access by a mechanic with a transfer case stand.

2. Description of the Prior Art

The use of transfer case securement apparatuses is known in the prior art. More specifically, transfer case securement apparatuses heretofore devised and utilized for the purpose of holding and supporting a transfer case are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,010,942 to Ward discloses a repair support assembly for automotive transmissions. U.S. Pat. No. 4,560,151 to Grundy discloses a transmission mounting stand. U.S. Pat. No. 4,993,686 to Diaz discloses a transmission work station. U.S. Pat. No. 5,141,211 to Adams, Jr. discloses a universal work station. U.S. Pat. No. 5,160,125 to Jenkins discloses a transmission utility stand.

While these devices fulfill their respective, particular objective and requirements, the aforementioned patents do not describe a transfer case stand that enables a mechanic to hold a transfer case at a fixed orientation for allowing ready access thereto.

In this respect, the transfer case stand according to the present invention substantially departs from the conventional concepts and designs of the prior art, and in doing so provides an apparatus primarily developed for the purpose of securely holding and supporting a transfer case of a vehicle from a fixed location for allowing ready access by a mechanic.

Therefore, it can be appreciated that there exists a continuing need for new and improved transfer case stand which can be used for securely holding and supporting a transfer case of a vehicle from a fixed location for allowing ready access by a mechanic. In this regard, the present invention substantially fulfills this need.

SUMMARY OF THE INVENTION

In the view of the foregoing disadvantages inherent in the known types of transfer case securement apparatuses now present in the prior art, the present invention provides an improved transfer case stand. As such, the general purpose of the present invention, which will be described subsequently in greater detail, is to provide a new and improved transfer case stand and method which has all the advantages of the prior art and none of the disadvantages.

To attain this, the present invention essentially comprises, in combination, a rigid and tubular casing having an open base end and a sealed tip end with the base end having a base coupling hole disposed therethrough. A rigid ring is positioned at a location above the casing such that the central axis of the ring is perpendicular to the central axis of the casing with the ring having a plurality of holes disposed therearound for receiving bolts of a transfer case of a vehicle. A first brace, a second brace, a third brace, and a fourth brace are included with the first brace extended between the base end of the casing and the ring, the second brace extended between the tip end of the casing and the ring, and the third brace and the fourth brace being opposed and extended between the ring and casing near the tip end thereof such that the second brace, third brace, and fourth brace define a tripod. A rigid holder is included and has a planar base plate with an integral eyelet extended upwards therefrom to define a horizontally positioned aperature. A rigid extension tube is included and has a base section slidably and rotatably disposed within the aperature of the eyelet and a tip section disposed through the base end of the casing with the base section having a first coupling hole disposed therethrough and a second coupling hole disposed therethrough at a location perpendicular to the first coupling hole and with the tip section having a third coupling hole disposed therethrough and aligned with the second coupling hole. A first coupling means is included and secured through the base coupling hole of the casing and third coupling hole of the extension tube, thereby coupling the casing with the extension tube. A second coupling means is extended through the eyelet of the holder with the second coupling means adapted to be secured through the first coupling hole of the extension tube in one orientation, thereby coupling the holder with the extension tube at a position such that the ring faces upwards, whereby allowing a transfer case coupled thereto to be held in a vertical orientation. The second coupling means is further adapted to be secured within the second coupling hole of the extension tube in another orientation, thereby coupling the holder with the extension tube at a position such that the ring faces sideways, whereby allowing a transfer case coupled thereto to be held in a horizontal orientation. Lastly, third coupling means is included and adapted for securing the base plate of the holder to a fixed location such as a work bench.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved transfer case stand which has all the advantages of the prior art transfer case securement apparatuses and none of the disadvantages.

It is another object of the present invention to provide a new and improved transfer case stand which may be easily and efficiently manufactured and marketed.

It is a further object of the present invention to provide a new and improved transfer case stand which is of durable and reliable construction.

An even further object of the present invention is to provide a new and improved transfer case stand which is susceptible of a low cost of manufacture with regard to both materials and labor, and which accordingly is then susceptible of low prices of sale to the consuming public, thereby making such a transfer case stand economically available to the buying public.

Still yet another object of the present invention is to provide a new and improved transfer case stand which provides in the apparatuses and methods of the prior art some of the advantages thereof, while simultaneously overcoming some of the disadvantages normally associated therewith.

Even still another object of the present invention is to provide a new and improved transfer case stand for securely holding and supporting a transfer case of a vehicle from a fixed location for allowing ready access by a mechanic.

Lastly, it is an object of the present invention to provide a new and improved transfer case stand comprising a cylindrical casing having a base end and a tip end; a ring positioned above the casing at a location such that the central axis of the ring is essentially perpendicular to the central axis of the casing, the ring having a plurality of holes disposed therearound for receiving bolts of a transfer case of a vehicle; bracing means coupled between the casing and ring; and positionable coupling means for coupling the base end of the casing to a fixed location such that the central axis of the ring is held at a selected angular orientation, thereby allowing a transfer case coupled thereto be held at the same selected orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
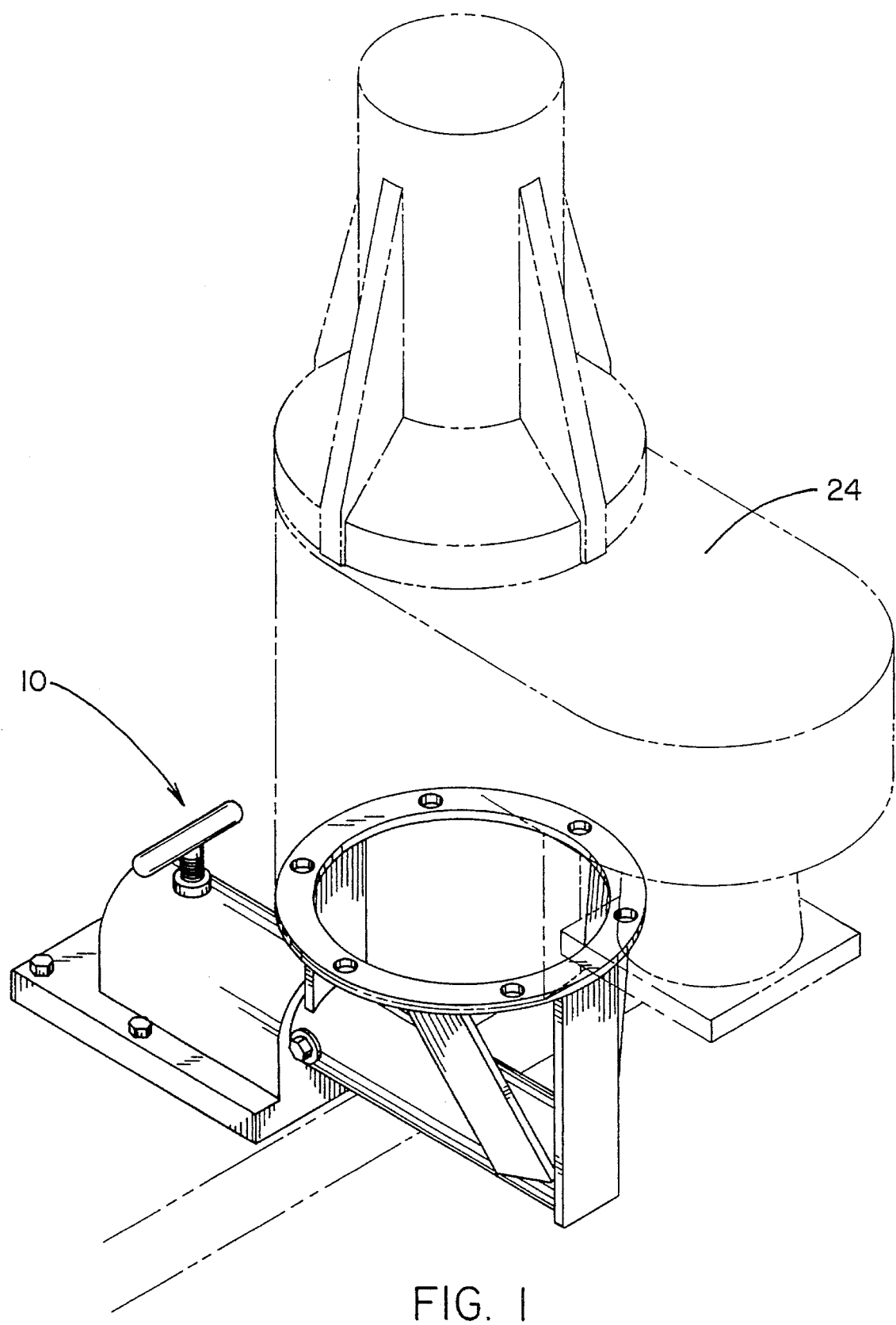
FIG. 1 is a perspective view of the preferred embodiment of the transfer case stand constructed in accordance with the principles of the present invention.
Figure 2:
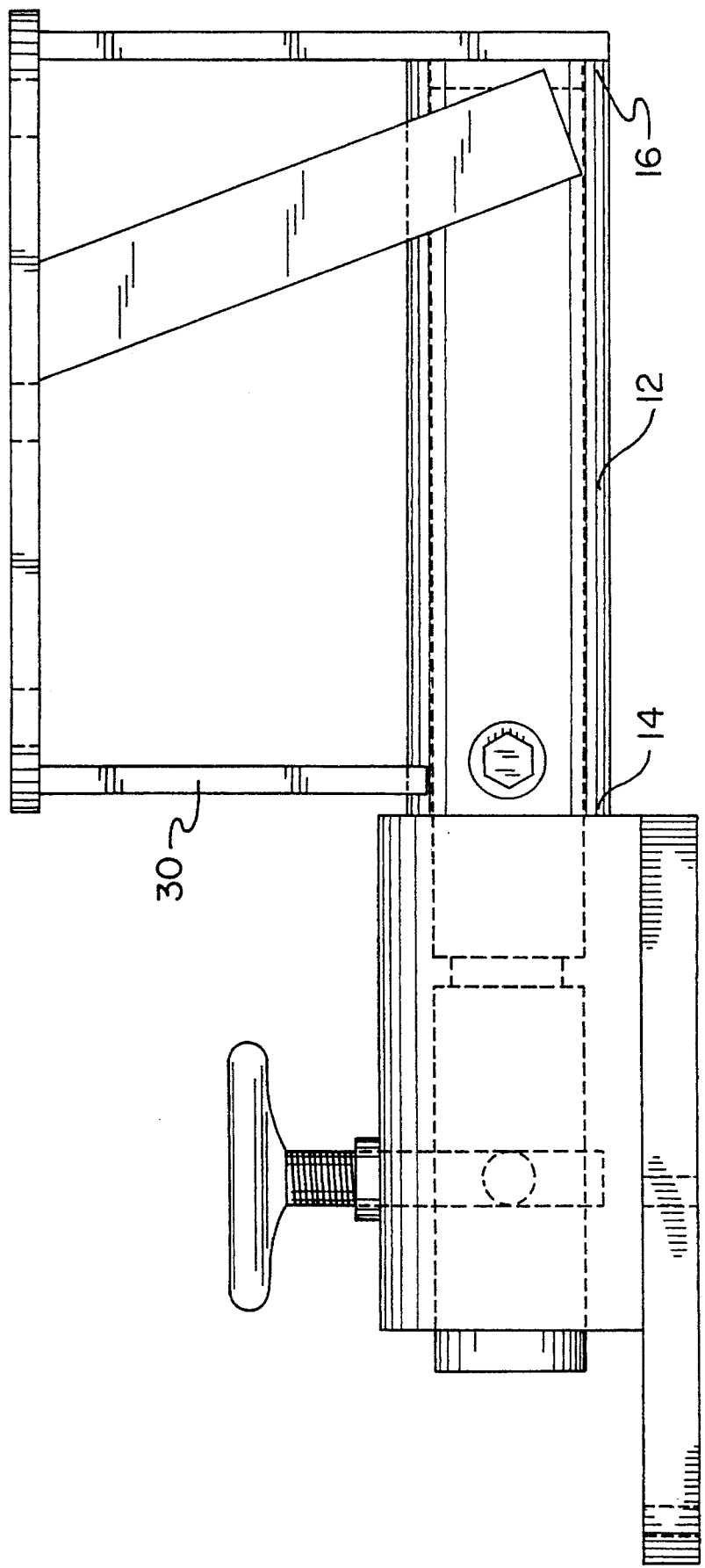
FIG. 2 is a side-elevational view of the present invention shown in FIG. 1.
Figure 3:
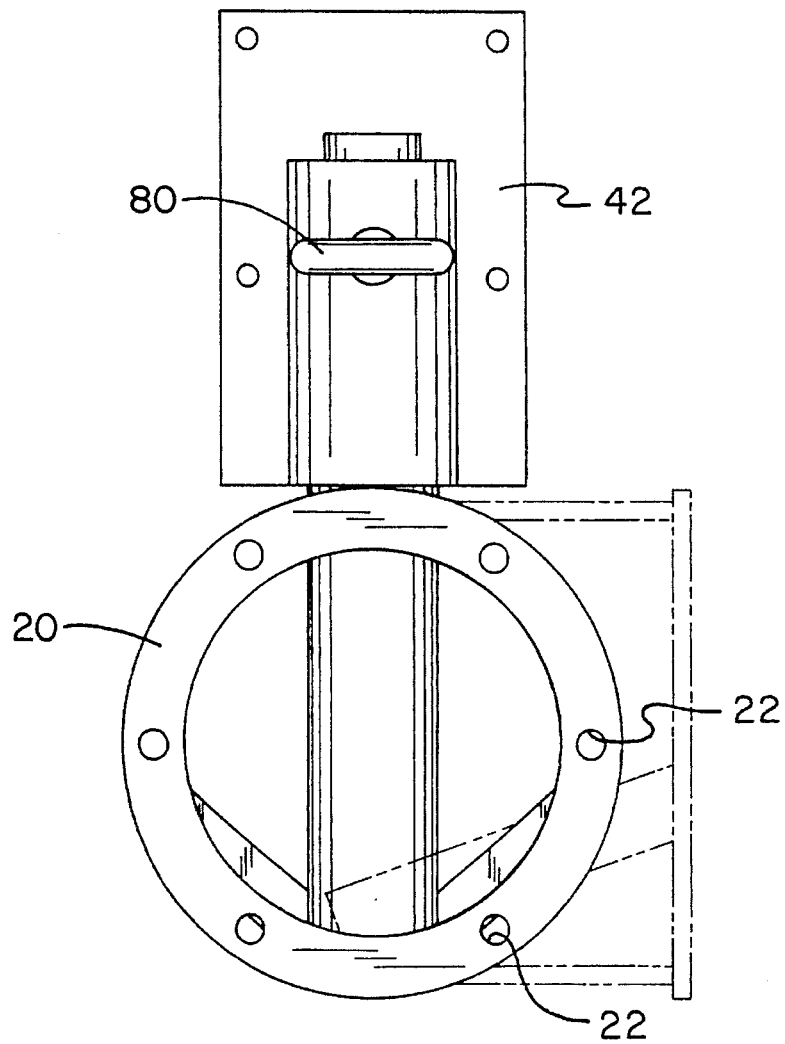
FIG. 3 is a plan view of the present invention depicting the ring facing upwards.
Figure 4:
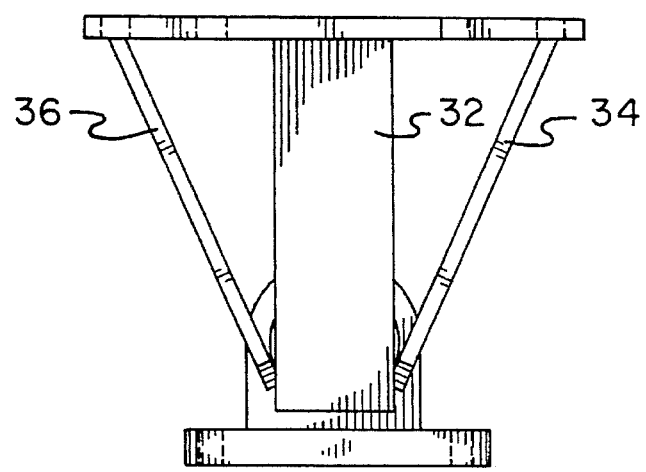
FIG. 4 is a side-elevational view of the present invention depicting the tripod for supporting the ring.
Figure 5:
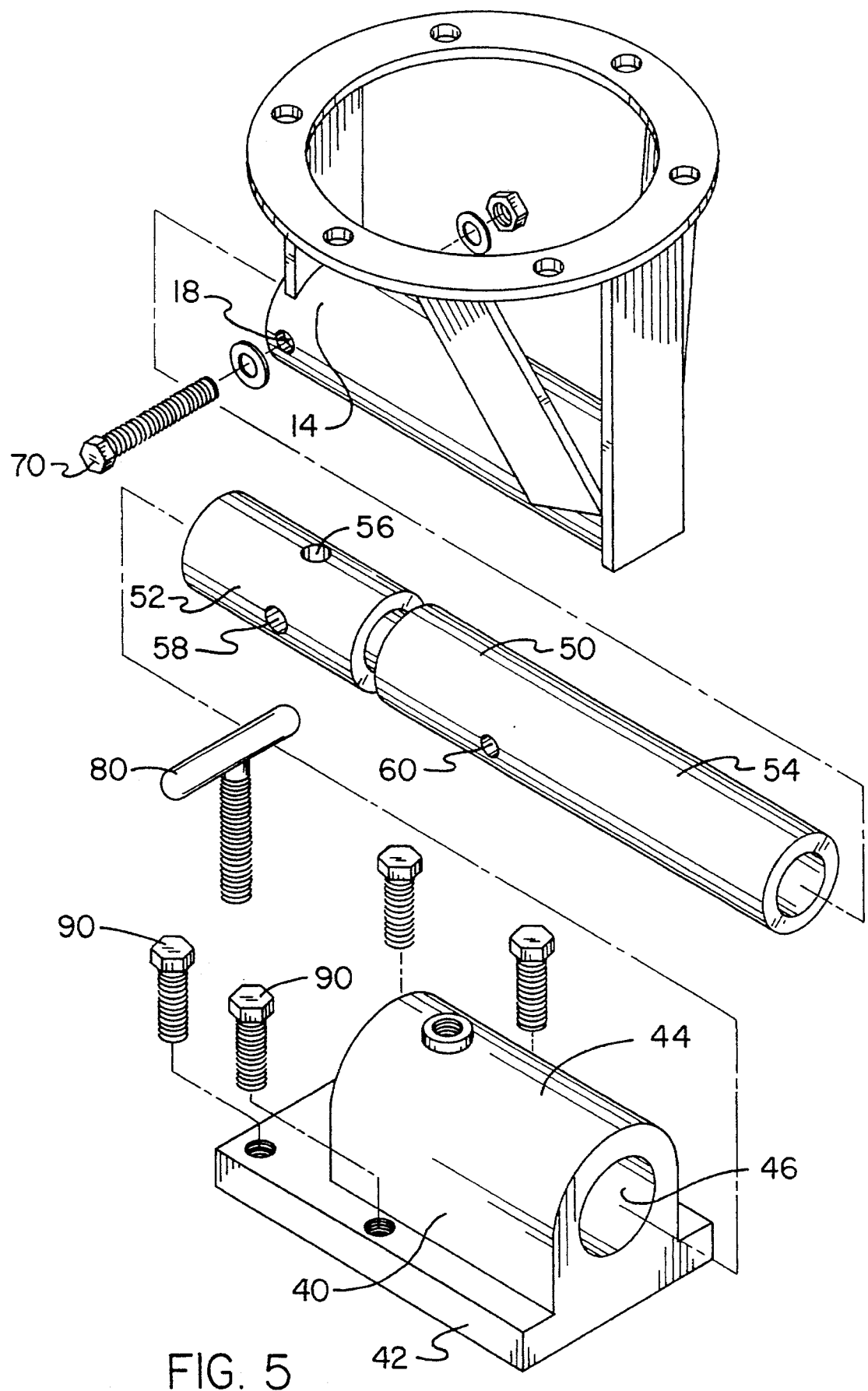
FIG. 5 is an exploded perspective view of the present invention.

With reference now to the drawings, and in particular, to FIG. 1 thereof, the preferred embodiment of the new and improved transfer case stand embodying the principles and concepts of the present invention and generally designated by the reference number 10 will be described.

Specifically, the present invention includes eight major components. The major components are the casing, ring, braces, holder, extension tube, first coupling means, second coupling means, and third coupling means. These components are interrelated to provide the intended function.

More specifically, it will be noted in the various Figures that the first major component is the casing 12. The casing is rigid and tubular in structure. It has an open base end 14 and a sealed tip end 16. The base end has a base coupling hole 18 disposed therethrough.

The second major component is the ring 20. The ring is rigid in structure. It is positioned at a location above the casing 12 such that its central axis is essentially perpendicular to the central axis of the casing. The ring has a plurality of holes 22 disposed therearound. The holes are adapted for receiving bolts of a transfer case 24 of a vehicle.

The third major component is the braces. The present invention includes a first brace 30, a second brace 32, a third brace 34, and a fourth brace 36. Each brace is elongated and rigid in structure. The first brace is extended between the base end 14 of the casing and the ring. The second brace is extended between the tip end 16 of the casing and the ring. Essentially, the second brace and the first brace are diametrically opposed with respect to the ring. The third brace and the fourth brace are each extended between the ring and casing near the tip end thereof. The third brace and the fourth brace essentially oppose each other across the diameter of the casing. Coupling of the second brace, third brace, and fourth brace between the casing and the ring define a tripod. This tripod provides increased rigidity and stability for holding a transfer case that is coupled to the ring.

The fourth major component is the holder 40. The holder is rigid in structure. It has a planar base plate 42. An integral eyelet 44 is extended upwards from the base plate and defines a horizontally positioned aperture 46. The holder is adapted to be coupled to a fixed location such as a work bench. The holder serves as a stationary support for the present invention.

The fifth major component is the extension tube 50. The extension tube is rigid in structure. It has a base section 52 and a tip section 54 delineated by an annular ring. The base section is slidably and rotatably disposed within the aperture 46 of the eyelet of the holder. The tip section 54 is disposed through the base end 14 of the casing. The base section has a first coupling hole 56 disposed therethrough. The base section also has a second coupling hole 58 disposed therethrough at a location perpendicular to the first coupling hole. Both coupling holes are extended through the central axis of the first section. Furthermore, the tip section has a third coupling hole 60 disposed therethrough. This third coupling hole is aligned with the second coupling hole of the first section. The third coupling hole is positioned at a location such that when the casing is disposed therearound, the third coupling hole is aligned with the base coupling hole.

The sixth major component is the first coupling means 70. The first coupling means is secured to the base coupling hole 18 of the casing and the third coupling hole 60 of the extension tube. The first coupling means couples the casing 12 with the extension tube 50. In the present invention, the first coupling means consists of a threaded bolt with complimentary washers and threaded nut.

The seventh major component is the second coupling means 80. The second coupling means is extended through the eyelet 44 of the holder. The second coupling means is adapted to be secured through the first coupling hole 56 of the extension tube in one orientation, thereby coupling the holder 40 with the extension tube 50 at a position such that the ring 20 faces upwards. With the ring facing upwards, a transfer case 24 may be coupled thereto and held in a vertical orientation. The second coupling means is further adapted to be secured within the second coupling hole 58 of the extension tube in another orientation, thereby coupling the holder with the extension tube at a position such that the ring faces sideways. With the ring held sideways, a transfer case may be coupled thereto and held in a horizontal orientation. Therefore, the present invention allows a user to place a transfer case in either a horizontal or vertical orientation for performing work thereon. In the present invention, the second coupling means consists of a threaded hole disposed through the eyelet and a T-shaped bolt having a threaded portion and a handle portion. The handle of the T-shaped bolt is tightened or loosened in order to couple or de-couple the extension tube from the holder.

The eighth major component is the third coupling means 90. The third coupling means is adapted for securing the base plate 42 of the holder to a fixed location such as a work bench. In the present invention, the third coupling means consists of a plurality of bolts each extended through a threaded hole on the base plate. These bolts would then be threadably secured to the fixed location.

The present invention securely supports a transfer case while a mechanic works on it. A transfer case is a mechanical device that transfers power from the transmission or the engine of a four-wheel or two-wheel drive vehicle to the wheels. It is difficult to prop or hold up a transfer case on a workbench while working on it. The present invention consists of a flat steel ring with six mounting holes drilled in it to match the mounting holes on the front face of the case. The ring is positioned above and parallel to a hollow cylindrical casing and supported by steel braces that are welded to the ring and to the casing. A smaller steel cylindrical rod fits into the casing and is secured in place by a steel bolt or pin. The front part of the rod inserts into a holding device on a workbench.

The front of a transfer case is mounted to a steel mounting plate on the stand and secured with six bolts. The cylindrical rod is inserted into a holder on the workbench and secured in place with steel bolts. With the transfer case held in an upright position over the workbench, the mechanic's hands are free to perform the repairs. Also, with the stand in use, more space is available on the workbench for tools and parts.

Working on a transfer case out of a vehicle, mechanics presently have to use wooden blocks to hold the transfer case upright on a workbench. It is difficult to keep a transfer case in this upright orientation because the wooden blocks shift while work is being performed. The present invention bolts to the front of the transfer case. The present invention prevents the transfer case from sliding while work is being performed on it. The present invention can be adapted to fit other transfer cases by changing the ring and casing, or individual rings designed to fit cases of different designs can be removably coupled to the casing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A transfer case stand for securely holding and supporting a transfer case of a vehicle from a fixed location for allowing ready access by a mechanic comprising, in combination:

a rigid and tubular casing having an open base end and a sealed tip end with the base end having a base coupling hole disposed therethrough;

a rigid ring positioned at a location above the casing such that the central axis of the ring is perpendicular to the central axis of the casing, the ring having a plurality of holes disposed therearound for receiving bolts of a transfer case of a vehicle;

a first brace, a second brace, a third brace, and a fourth brace with the first brace extended between the base end of the casing and the ring, the second brace extended between the tip end of the casing and the ring, and the third brace and the fourth brace being opposed and extended between the ring and casing near the tip end thereof such that the second brace, third brace, and fourth brace define a tripod;

a rigid holder having a planar base plate with an integral eyelet extended upwards therefrom to define a horizontally positioned aperture;

a rigid extension tube having a base section slidably and rotatably disposed within the aperture of the eyelet and a tip section disposed through the base end of the casing, the base section having a first coupling hole disposed therethrough and a second coupling hole disposed therethrough at a location perpendicular to the first coupling hole, the tip section having a third coupling hole disposed therethrough and aligned with the second coupling hole;

first coupling means secured through the base coupling hole of the casing and third coupling hole of the extension tube, thereby coupling the casing with the extension tube;

second coupling means extended through the eyelet of the holder, the second coupling means adapted to be secured through the first coupling hole of the extension tube in one orientation, thereby coupling the holder with the extension tube at a position such that the ring faces upwards, whereby allowing a transfer case coupled thereto to be held in a vertical orientation, the second coupling means further adapted to be secured within the second coupling hole of the extension tube in another orientation, thereby coupling the holder with the extension tube at a position such that the ring faces sideways, whereby allowing a transfer case coupled thereto to be held in a horizontal orientation; and third coupling means adapted for securing the base plate of the holder to a fixed location such as a work bench.

2. A transfer case stand for securely holding and supporting a transfer case of a vehicle from a fixed location for allowing ready access by a mechanic comprising:

a cylindrical casing having a base end and a tip end;

a ring positioned above the casing at a location such that the central axis of the ring is essentially perpendicular to the central axis of the casing, the ring having a plurality of holes disposed therearound for receiving bolts of a transfer case of a vehicle;

plurality of braces coupled between the casing and ring; and positionable coupling means for coupling the base end of the casing to a fixed location such that the central axis of the ring is held at a selected angular orientation including:

a holder having a planar base plate with an integral eyelet formed thereon for slidably and rotatably receiving the base end of the casing, a plurality of coupling apertures with fixed positions with respect to the casing, a bolt disposed through the eyelet of the holder removably inserted into one of the plurality of coupling apertures thereby securing the casing to the eyelet, and a plurality of bolts extended through the base plate of the holder and adapted to be secured to a fixed location.

3. The transfer case stand as set forth in claim 2 wherein the casing is releasably coupled to the positionable coupling means thereby allowing the casing to be replaced.

* * * * *